Nov. 18, 1969     T. E. RUDEN     3,479,577
CROSSED FIELD MICROWAVE RECTIFIER
Filed May 19, 1967     6 Sheets-Sheet 1

INVENTOR
THOMAS E. RUDEN
BY Edgar O. Kost
ATTORNEY

PRIOR ART LINEAR RECTIFIER

PRIOR ART RF OSCILLATOR OPERATED AS DC RECTIFIER

INVERTED PROPOSED RECTIFIER

INVENTOR
THOMAS E. RUDEN
ATTORNEY

Nov. 18, 1969     T. E. RUDEN     3,479,577
CROSSED FIELD MICROWAVE RECTIFIER

Filed May 19, 1967     6 Sheets-Sheet 5

INVENTOR
THOMAS E. RUDEN
BY
ATTORNEY

Nov. 18, 1969   T. E. RUDEN   3,479,577
CROSSED FIELD MICROWAVE RECTIFIER
Filed May 19, 1967   6 Sheets-Sheet 6

INVENTOR
THOMAS E. RUDEN
BY
ATTORNEY

United States Patent Office 3,479,577
Patented Nov. 18, 1969

3,479,577
CROSSED FIELD MICROWAVE RECTIFIER
Thomas E. Ruden, Newton Highlands, Mass., assignor to Raytheon Company, Lexington, Mass., a corporation of Delaware
Filed May 19, 1967, Ser. No. 639,668
Int. Cl. H02m 7/02
U.S. Cl. 321—8        13 Claims

ABSTRACT OF THE DISCLOSURE

The invention relates to a device for conversion of high power radio frequency electromagnetic energy in the microwave spectrum into direct current energy. An inverted tube geometry comprising electron generation or confining means of substantially large curvature together with an internal slow wave periodic delay line structure provides the basic structure for optimum electron-radio frequency wave interaction to result in a significantly high efficiency energy converter. Various electron beam sources are disclosed as well as auxiliary electrode configurations to achieve appropriate space charge conditions essential to achieve high DC power and efficient operation.

BACKGROUND OF THE INVENTION

The efficient conversion of microwave energy to direct current energy is highly desirable in view of the fact that in the present state of the art in microwave frequency generators, exceedingly high powers, in the order of many millions of watts, are capable of being transmitted in electromagnetic waves which are propagated over appropriate distances without the necessity of providing wire transmission lines. A United States Letters Patent 3,219,904 issued to John M. Osepchuk on Nov. 23, 1965 discloses an early prototype microwave energy rectifier capable of handling relatively low powers and having a conversion efficiency of approximately 30 to 40 percent. The traveling wave type electron discharge device disclosed in the aforesaid patent includes an injected beam of electrons and a substantially linear radio frequency delay line structure. For the purposes of the present discussion of the invention, the term "linear" will be employed to define devices having coplanar mutually parallel electrode bounding means which are essentially of a straight line configuration or one having a relatively small curvature.

In the conversion of microwave energy to direct current electrical energy the interrelationship between the electrons and an idealized radio frequency circuit is of primary importance in consideration of power output and efficiency. The electrons emitted in the beam follow a trajectory along the interaction path defined by the boundary electrodes and influenced by the crossed electric and magnetic fields. The microwave power is applied to a slow wave propagating delay line structure which is coupled in energy exchanging relationship with the electron beam. As the wave propagated in the line gives up energy to the electrons such electrons coalesce into spokes in regions where the tangential radio frequency fields are strongest. The electrons absorb power from the radio frequency field and act as a load. As the power is transferred from the electromagnetic waves to the electrons, the electrons being of negative charge move to lower and lower electrostatic equipotential lines in the interaction space defined by the slow wave delay line structure and a coplanar electrode. As the electrons move closer and closer to the slow wave delay line structure they eventually strike the radio frequency line and are collected there. As the electron beam absorbs the high level energy from the microwave propagating field the electrons in turn do work on the direct current field coupled to the bounding electrodes. This work is delivered to a resistive load which may be coupled to the device to utilize the direct currents now generated in the rectifier. In accordance with the principles of the conservation of energy the work performed by the radio frequency field on the electrons will be at approximately or substatnially the same rate that the electrons perform work on the direct current field.

The efficiencies and power handling capabilties of the prior art embodiments of microwave energy to direct current rectifiers, particularly in the traveling wave electron discharge tube configuration, have been found to be restricted in the capability of generating higher density electron beams in the interaction space to thereby rectify higher and higher levels of DC power.

SUMMARY OF THE INVENTION

In accordance with the teachings of the present invention a microwave rectifier is provided wherein the device is capable of supporting an electron stream of high space charge density to result in efficient, high power rectification. Experimental and theoretical analysis has demonstrated that the poor performance of prior art embodiments in terms of low efficiency is directly attributable to the failure to provide a structure capable of supporting a beam of high space density in the interaction region. Prior art rectifier work merely involved operating a linear magnetron amplifier in reverse by driving the device with radio frequency power and reversing the polarities of the potentials between the anode and sole. Similar work was performed on the conventional magnetron of circular format. In addition to the weak space charge RF wave interaction, in this case a difficult problem exists in that the slow wave radio frequency delay line circuit is preferably maintained at a potential negative with respect to the cathode electrode coextensively disposed therewith to define the interaction space. A substantial retarding electric force exists at the cathode surface when considering rectifiers having a configuration with the cathode disposed centrally which results in suppression of electron emission from the cathode.

The present invention describes a configuration which permits high space charge RF wave interaction, and the electric forces at the cathode are carefully controlled so as to aid in the emission of electrons from the cathode. The invention results in the provision of a re-entrant type beam rectifier of an inverted geometry wherein the electron generation means are disposed concentrically around a radio frequency delay line circuit. The curvature of the internally disposed radio frequency circuit will be shown to provide substantially stronger radio fields for interaction with an electron beam of very high densities. The concentrically disposed electron beam path has been optimized by providing substantially large curvature to permit the accumulation of a copious supply of electrons in the interaction region.

Additional illustrative embodiments of the invention are disclosed wherein a continuous cathode configuration is employed as well as the injected electron beam emitted from a gun electrode assembly disposed at a point along the interaction path. Further, reference will be directed to the provision of a device having an auxiliary sole electrode encircling a grid of cathode electrodes to thereby further optimize the interaction phenomenon between the electrons in the beam and the radio frequency wave propagating along the delay line circuit.

BRIEF DESCRIPTION OF THE DRAWINGS

The invention as well as the details of the construction of a preferred embodiment will be readily understood after consideration of the following detailed description and reference to the accompanying drawings, in which.

THEORETICAL CONSIDERATIONS OF HIGH POWER ENERGY GENERATION AND RECTIFICATION

Figure 1A:
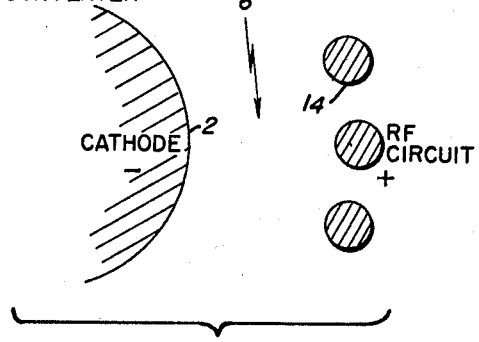
FIG. 1A is a schematic representation of a conventional DC-RF generator geometry.
Figure 1B:
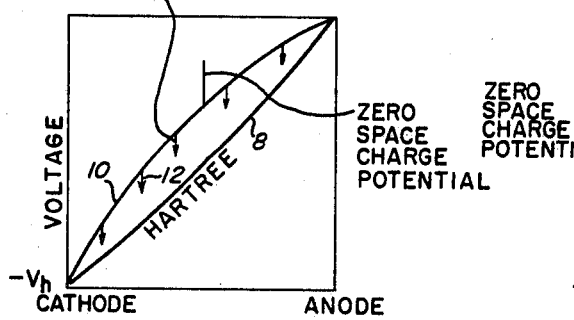
FIG. 1B is a voltage curve illustrative of the space charge effects as well as the Hartree values of the potentials throughout the interaction region for the conventional geometry illustrated in FIG. 1A.

FIGS. 1A and 1B illustrate in a simplified manner the problems asociated with the art to which the invention pertains. A centrally disposed cathode electrode 2 is encircled by slow wave delay line circuit comprising individual members collectively designated 14. Interaction space 6 is defined between the respective concentric electrodes. The electrons emitted from the cathode 2 in the conventional generator such as a magnetron or Amplitron form a reentrant electron stream which traverses the interaction space under the influence of crossed electric and magnetic fields. The electrons interact with the electromagnetic waves propagating on the slow wave circuit when a synchronous condition is established at a so-called threshold potential, referred to in the art as the Hartree potential. The electrons move through the crossed uniform electric and magnetic fields and travel at a velocity having its major component normal to the electric and magnetic fields. In the absence of a coextensive radio frequency field the space charge in the interaction region viewed in its entirety froms a substantially rotating cylindrical sheet around the cathode member. Under the influence of the fringing radio frequency fields, however, a focusing action results wherein the electrons are phase-focused into spokes of charge extending from a hub or cloud of electrons surrounding the cathode. The spokes of the hub rotate with an angular velocity in synchronism with the alternating high frequency RF fields on the slow wave circuit. The ends of the spokes brush by the circuit members and effectively transfer a charge from the cathode to the anode which in this illustrative example would be the RF circuit line. If the current per unit length drawn from the cathode through the spokes to the anode is small then the DC potential electric field in the interaction space will be essentially the space charge free potential. The electrons will not coalesce into tight cohesive groups and the spokes in the space charge will be non-synchronous over the delay line circuit. As a result of this condition low efficiency results.

Conversely, if the current per unit length is large in the interaction region the space charge depresses the DC potential to produce synchronous interaction over the length of the electron orbit thereby yielding higher efficiencies and high power conversion. In FIG. 1B the voltage conditions for the embodiment shown in FIG. 1A are indicated with curve 8 designating the Hartree potential and curve 10 the zero space charge potential. It may be noted that the zero space charge potential is larger than the Hartree potential which implies that the electrons are traveling at a rate faster than that required for synchronism. Arrows 12 indicate the effect of space charge to depress the potential toward the Hartree potential thereby allowing the electrons to give up to the RF field a larger portion of the energy gained in its fall through the DC field to the anode member. This condition wherein a large amount of space charge is available to depress the potential to the Hartree level is ideal to achieve high power rectification and efficient operation.

Figure 2A:
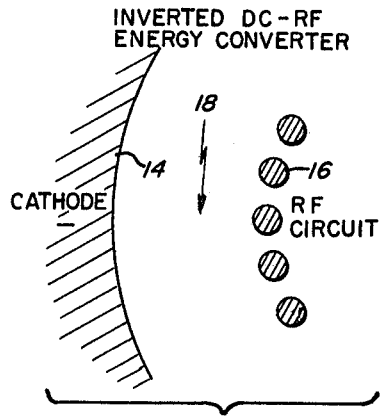
FIG. 2A is a schematic representation of an inverted DC-RF generator geometry.

Referring next to FIG. 2A, a generator of high frequency electromagnetic energy of an inverted geometry is illustrated. In this configuration the cathode of substantial curvature 14 surrounds and encircles an internally disposed RF slow wave delay line circuit 16. The interaction space 18 is defined between the aforesaid electrodes. The voltage potentials in this inverted design are similar to those in the conventional energy generator illustrated in FIG. 1A, i.e., the cathode at a negative potential and the RF delay line circuit at a positive voltage.

Figure 2B:
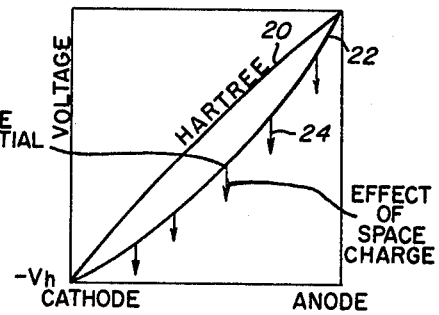
FIG. 2B is a voltage curve illustrative of the space charge effects as well as the Hartree values of the potentials throughout the interaction region for the inverted geometry illustrated in FIG. 2A.

In FIG. 2B it will be noted that with this design the Hartree potential curve 20 is substantially higher than the zero space charge potential curve 22. The effect of the space charge is indicated by the arrows 24 and electrons in a space charge in the interaction space will therefore tend to further depress the DC electric fields to the extent that synchronism cannot be achieved. The device of this configuration will have a rather dubious operative life with very low expected efficiencies.

Figure 3A:
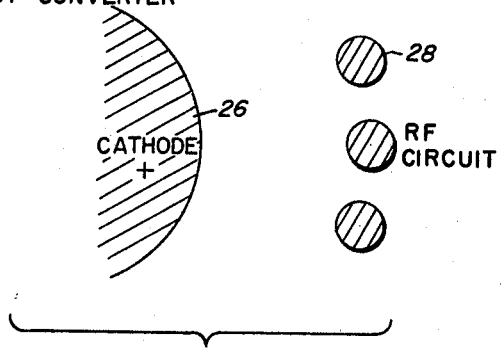
FIG. 3A is a schematic representation of a conventional prior art RF-DC energy converter.
Figure 3B:
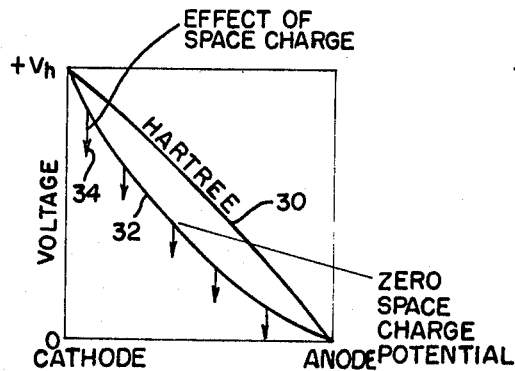
FIG. 3B is a voltage curve illustrative of the space charge effects as well as the Hartree values of the potentials throughout the interaction region for the prior art energy converter illustrated in FIG. 3A.

Next, analogous device geometries will be considered for rectification of microwave energy into direct current energy. In the previously described RF oscillator structures the cathode was preferably biased at a negative potential while the RF delay line was biased positively. Referring now to FIG. 3A we find the dual of the tube configuration shown in 1B; however, the energy converter in this instance is run in an opposite manner with the cathode 26 at a substantially positive potential while the RF delay line circuit 28 is negatively biased. Reversal of the operating DC potentials results in the voltage curve shown in FIG. 3B wherein curve 30 for the Hartree potential is substantially higher than the zero space charge voltage curve 32. The potential depression due to the space charge indicated by the arrows 34 now illustrate a nonoptimum condition following substantially along the lines of that revealed in the voltage curve diagram in FIG. 2B wherein any interaction is highly inefficient.

Figure 4A:
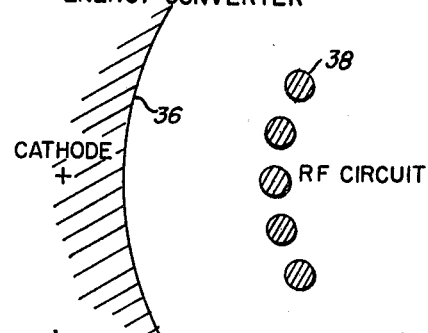
FIG. 4A is a schematic representation of an inverted RF-DC energy converter in accordance with the present invention.
Figure 4B:
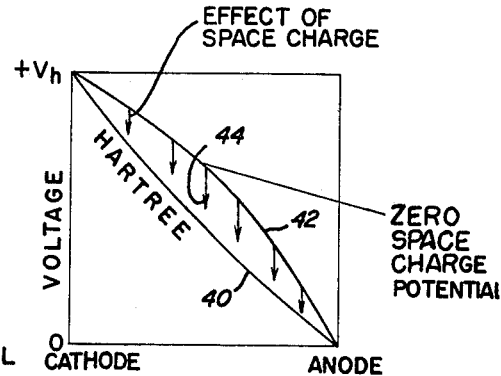
FIG. 4B is a voltage curve illustrative of the space charge effects as well as the Hartree values of the inverted energy converter configuration illustrated in FIG. 4A.

In FIG. 4A a cathode of 36 of relatively large curvature surrounds and encircles the RF circuit line 38 in substantially the same manner as the configuration shown in FIG. 2A. Reversal of the potentials with this inverted geometry now results in a device having highly desirable electron RF wave interaction. Hence, the space charge potential depression is indicated by the positioning of the Hartree potential curve 40 in FIG. 4B below the zero space charge potential curve 42. The effect of the space charge is indicated by the arrows 44. It is thus evident that what is considered an optimum interaction condition for the generation of high power radio frequency energy as shown in FIG. 1B may now be realized for the rectification of microwave energy in a geometry inverted from that of the conventional oscillator and reverse potentials. The primary requirement resides in the provision of large curvature or concentric boundary electrodes defining an interaction region of large curvature for supporting an injected high density electron beam.

DESCRIPTION OF PREFERRED EMBODIMENTS

Figure 5A:
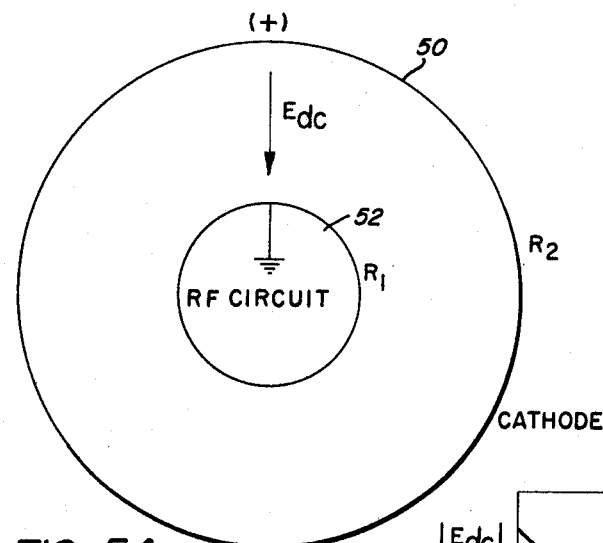
FIG. 5A is a schematic representation of an illustrative embodiment of the invention incorporating a continuous cathode surface to provide a re-entrant electron beam.
Figure 5B:
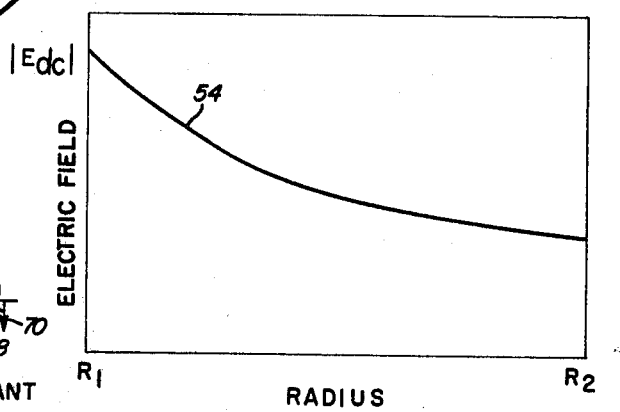
FIG. 5B is a diagram for the field variation in the interaction region defined between the two electrodes having radii $R_1$ and $R_2$.
Figure 5C:
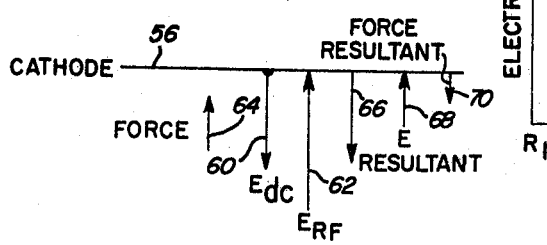
FIG. 5C is a short form diagram illustrative of the respective DC and RF electric field forces in an interaction region influenced by crossed electric and magnetic fields.

Referring first to FIGS. 5A to 5C, an embodiment for improved rectification of microwave energy into direct current energy is illustrated. Broadly, the rectifier of the invention embodies an interaction space of large circular configuration bounded by concentrically disposed electrodes. The inverted geometry theoretically considered superior to prior art linear or small curvature microwave rectifiers envisages the definition of the inwardly disposed concentric electrode by the slow wave structure necessary for the propagation of the radio frequency electromagnetic waves. In the embodiment now under consideration the remaining concentric electrode comprises a continuous cathode having a circumferential emitting surface defining the outer bounding electrode of the interaction space. Cathode electrode 50 maintained at a positive potential as indicated by the sign (+) is presumed to have a radius indicated $R_2$. The RF circuit 52 is presumed to have a radius indicated as $R_1$ and is maintained at ground potential.

In the continuous cathode energy converter configuration now under consideration the synchronous condition between the electrons and the radio frequency waves can only be achieved if a copious supply of electrons is available. Under weak space charge conditions the interaction is nonsynchronous yielding diode behavior. Considering first the DC conditions existing in the illustrative device the resultant electric field as well as radio frequency field forces and their effect upon electrons disposed between the bounding electrodes will now be discussed. Curve 54 shown in FIG. 5B is a plot of the electric field potential in the interaction space defined between the RF circuit having a radius $R_1$ and the outwardly disposed cathode member with a radius $R_2$. It may be noted that the electric field variation is nonlinear in the interaction region and decreases with increasing radius. A retarding field effect can be substantially minimized in a microwave rectifier by providing a radio frequency field on the delay line circuit of sufficient magnitude and strength to provide the proper field for the electrons to enter the interaction space.

In further consideration of the field strengths desired in the rectification of the microwave energy reference is now directed to FIG. 5C. If we consider two spaced electrode members, namely cathode 56 and RF circuit 58, with the cathode biased at a slightly positive potential, it is apparent that RF voltages must be developed on the slow wave circuit of sufficient magnitude to offset the direct current fields which may inhibit emission. The curvature of the electron trajectories in the interaction region may be speeded up to the extent that they are increased and return to the cathode without giving up any energy to the circuit waves. The direct current vector due to the potential difference between the respective bounding electrodes is indicated by the arrow 60. Now the electric field generated by the radio frequency waves is directed in an opposite manner as indicated by the arrow 62. Vectorially, the combination of the electric and magnetic fields to get the emission of an electron involves a factor referred to in the art as $-eE$ which is the force due to the electric field and the $e$ is the symbol for the charge of the electron. Now the force exerted by the $E_{dc}$ field is indicated by the arrow 64 which extends in an opposite manner and the force exerted by the $E_{rf}$ field is indicated by the arrow 66. The combined E fields in the interaction space are indicated by arrow 68 and since the resultant fields are directed toward the cathode as indicated by the arrow 68 the force exerted by this field will be in the opposite direction as indicated by the arrow 70. An electron, therefore, leaving cathode 56 is in a very favorable position due to the high $E_{rf}$ field to continue traversing the area defined between the bounding electrodes and be absorbed in the RF delay line circuit. The primary requirement then in the design of a device of the continuous cathode configuration involves the provision of a sufficiently high RF field to provide the proper attitude of the electrons entering the interaction space.

Figure 6:
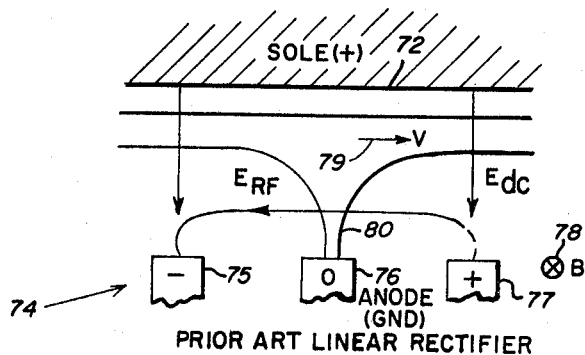
FIG. 6 is an explanatory diagram of a crossed field device having injected beam electron producing means to illustrate the space charge spokes which are established in the presence of RF fields in conventional prior art microwave energy converter configurations.
Figure 7:
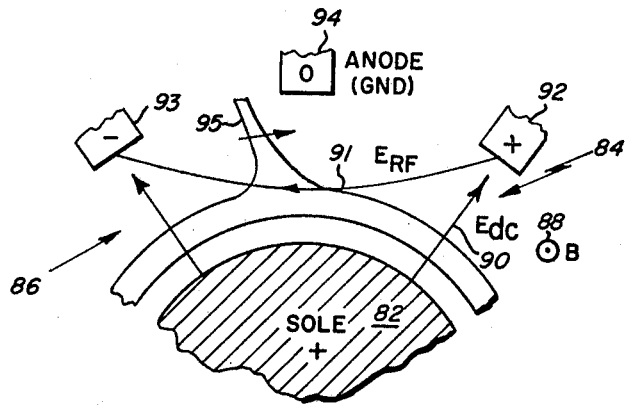
FIG. 7 is a diagrammatic representation of normal crossed-field RF generator devices with the sole electrode mounted internally and a large RF interacting field provided concentrically thereto.
Figure 8:
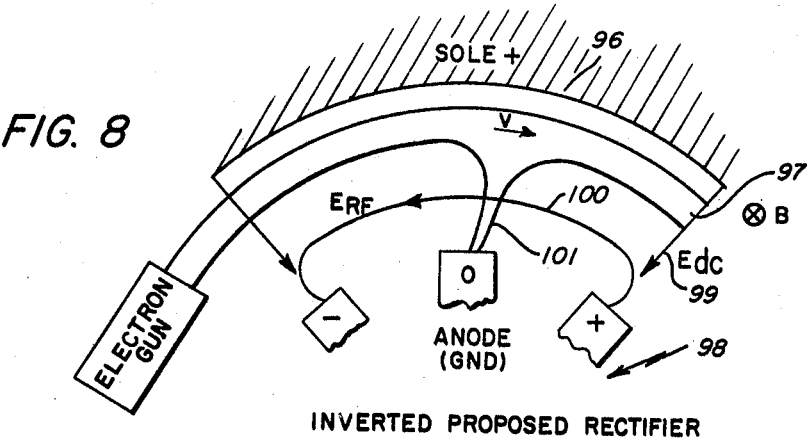
FIG. 8 is a diagrammatic approximation of the space charge effects in an illustrative embodiment of the present invention.

In FIGS. 6–8 attention is now directed to the embodiments of the invention utilizing an injected electron beam. The boundary electrodes comprise a positively biased sole electrode spaced from the RF slow wave delay line and defining therebetween the interaction space. The injected beam of electrons traverses the interaction space along a circular orbit with the trajectory determined primarily by the electron gun parameters. The angular velocity of the electrons is adjusted to provide for synchronism with the circuit waves and the interaction is of the traveling wave type.

In FIG. 6 the prior art linear type of microwave rectifier is schematically illustrated and follows the teachings of the aforementioned United States Letters Patent. Sole electrode 72 is positively biased and extends coextensively with the RF circuit indicated by the numeral 74. In the conventional RF circuit which may also be referred to as the anode we find alternate biasing on the delay line elements, for example element 75 is negatively biased, element 76 is at zero or ground potential and element 77 is at positive potential to thereby define the sinusoidal potential distribution of the power on the circuit. The electric field lines between the coextensive electrodes is indicated by the symbol ($E_{dc}$) and the crossed magnetic field is indicated by 78. Arrow 79 represents the traversal of electrons having a velocity designated by the symbol V. In the space charge free approximation the direct current electric field is uniform and maintains synchronism of the electrons with the radio frequency wave on the delay line circuit 74. The electrons coalesce into spokes 80 in the regions where the radio frequency field does work on the electrons. With a low space charge the spokes are symmetrically oriented about the radio frequency zero potential, illustratively 76 in FIG. 6. If an electron beam of high space charge density is injected into the device to achieve high output power the conditions for synchronism will not be met. Interaction will therefore be inefficient.

In FIG. 7 the configuration of a conventional high power radio frequency generator operated with reverse potentials for microwave rectification is considered. The curvature of the internal sole electrode 82 is substantially small and the radio frequency oscillating circuit 84 is disposed as the outer concentric electrode. The magnetic field is oriented as shown by the circle and dot 88. The electric field ($E_{dc}$) is indicated by the arrow 90 and the electric field defined by the radio frequency circuit wave is indicated by the arrow 91 extending between the positive delay line element 92 and negative element 93. The zero potential member is illustratively indicated by the numeral 94. In the analysis of the space charge in the interaction region it is noted that the electrons fall behind the radio frequency zero potential as a result of the inability of the space charge to establish the Hartree synchronism potential. The spoke 95 indicates the approximate position of the retarded space charge. In this position the out-of-phase electrons tend to speed up and drift towards the anode with a corresponding reduction in the transit time necessary for proper focusing and energy exchange in microwave rectification. The electrons interact primarily with a reduced tangential component of the radio frequency field which yields low coupling of the circuit wave to the electrons. Such interaction therefore would provide an inefficient direct current rectifier which leads to the consideration of the improved inverted configuration proposed in accordance with the teachings of the present invention.

Referring now to FIG. 8, a sole electrode 96 defines a direct current bounding field of substantially large curvature for electrons injected into the interaction space 97 defined with the coextensive internally disposed radio frequency circuit structure 98. The direct current electric field line 99 is now directed radially inwardly and the radio frequency electric field lines 100 extend between the positive and negative elements of the delay line circuit 98. The spoke 101, it will be noted, is focused in a favorable position and provides a long transit time to allow for the out-of-phase electrons to coalesce into the spokes. Ideal conditions therefore are indicated for the synchronism of the electrons with the radio frequency circuit waves to provide high efficiency in direct current rectification utilizing the inverted geometry of the invention.

Figure 9A:
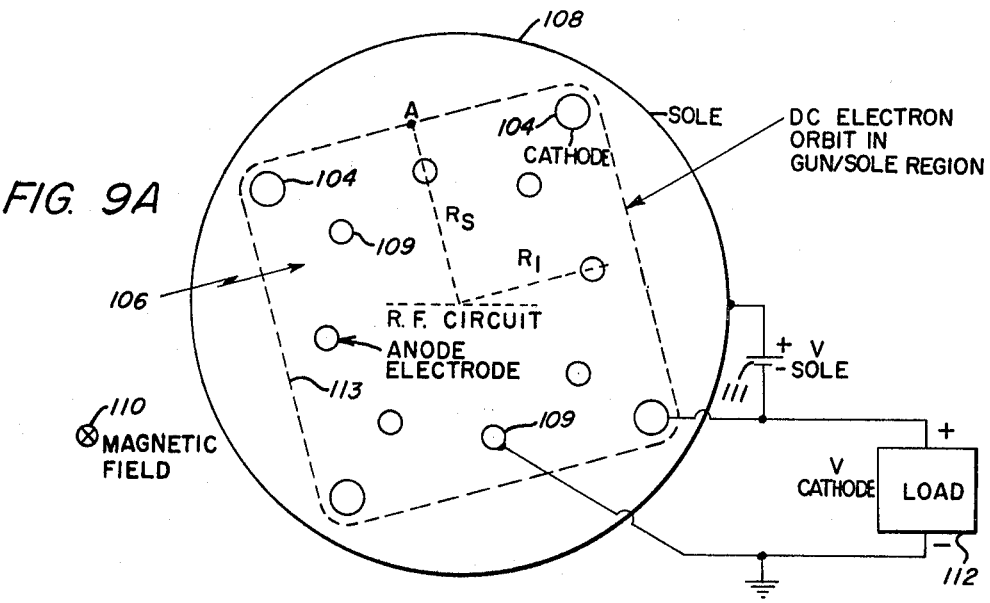
FIGS. 9A and 9B are diagrammatic representations of still another embodiment of the invention incorporating plural electron generation means as well as a coextensive electrode illustrative of a microwave rectifier of an inverted geometry.
Figure 9B:
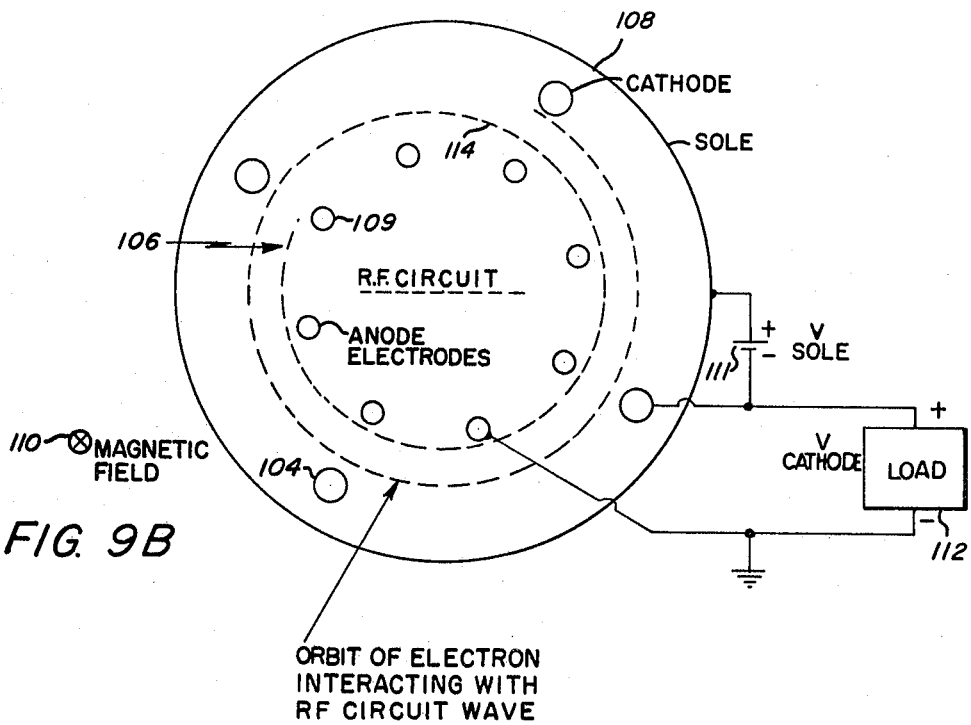

Referring next to FIGS. 9A and 9B, another embodiment of the invention comprising a grid of electron generation means is disclosed to provide a re-entrant electron beam. In this configuration a plurality of cathode elements 104 are disposed in the region 106 defined between sole electrode 108 and anode electrodes 109 which form the over-all radio frequency slow wave delay line circuit. Preferably, an emissive surface on one side of the cathode members is desired to achieve directivity in determining the trajectory of the resultant electron beam. The combination of the potentials of the sole eletcrode relative to the cathode member as well as the magnetic field indicated by the circle and cross 110 provides for the control of the trajectory of the emitted electrons. Sole electrode 108 is biased at a slightly higher positive potential by means of a supply 111. The cathode members are biased by a potential resulting from current flow through the external load 112, while the anode members 109 are maintained at ground potential which may therefore be considered as negative with respect to the aforesaid cathode and sole elements. The motion of the electron beam follows the equipotential lines which are shown as being directed into the interaction space 106 along a path indicated by the dotted line 113 where the electrons may interact with the radio frequency fringing fields. An electron therefore at a point A in the trajectory will have a radius designated $R_S$. The potential at this point is then $$V = V_0 \left(\frac{R_s}{R_1}\right)^2$$

where $V_0$ is the usual crossed field scaling parameter, $$V_0 = 1/2 \frac{m}{e} \left(\frac{2\pi f}{k}\right)^2 R_1^2$$

and $m$ is the mass of the electron, $e$ the electron charge and $k$ the mode number.

Since the basic requirement is that the electrons in the beam must be influenced by the radio frequency field for approximately one cycle in order for synchronous interaction to occur in the traveling wave configuration the electrons properly phased will be drawn into the interaction region 106. In FIG. 9B with similar numerals indicating the similar structure in FIG. 9A, the trajectory of such electrons when properly phased is indicated by the dotted line 114. It will be noted that this circular orbit is of a gradually reducing diameter until the orbiting electrons are absorbed by the anode electrodes.

Figure 11:
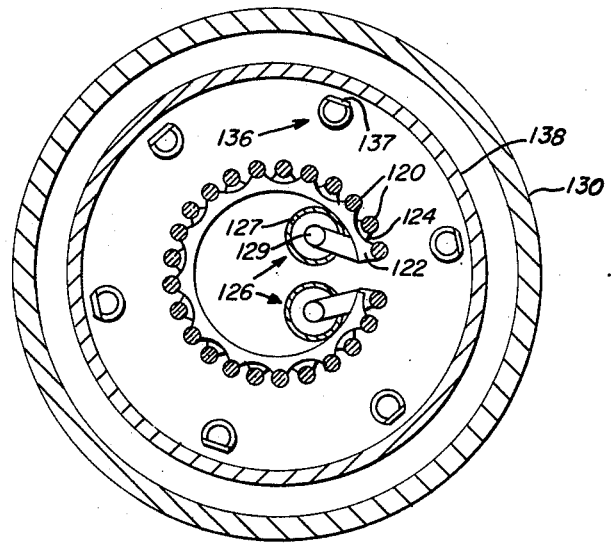
FIG. 11 is a detailed cross-sectional view taken along the line 11—11 in FIG. 10.
Figure 10:
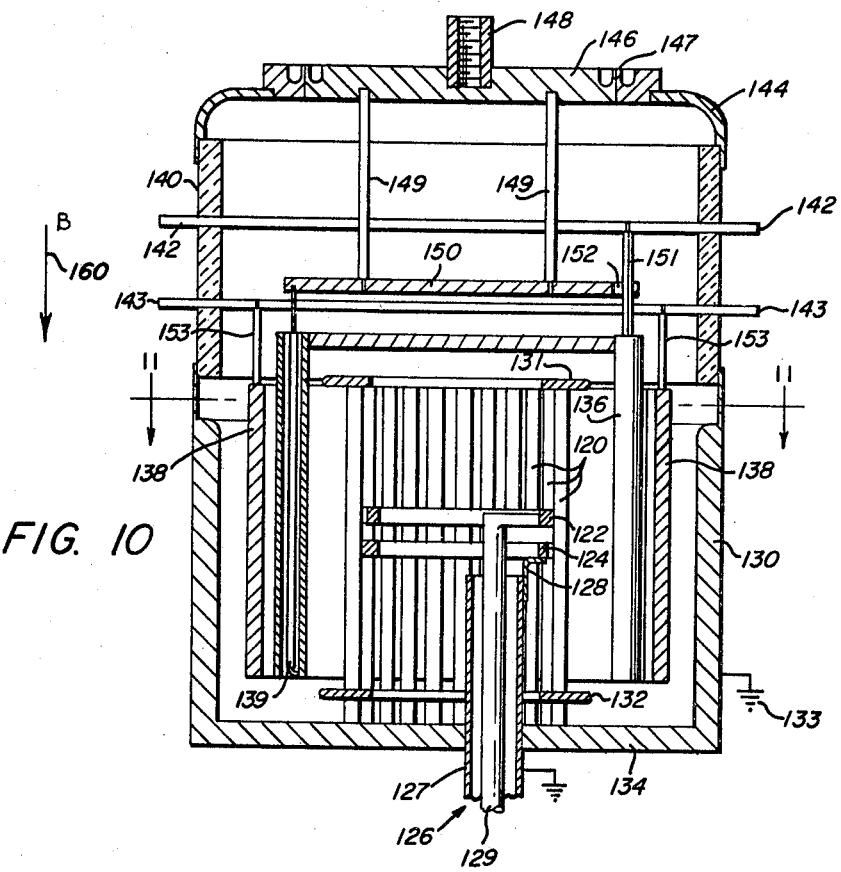
FIG. 10 is a vertical cross-section illustrative of a microwave energy converter incorporating a nonresonant delay line illustrative of an embodiment of the invention.

A practical realization of the illustrative embodiment shown in FIGS. 9A and 9B will now be described, reference being directed to FIGS. 10 and 11. The crossed field microwave rectifier device shown utilizes a slow wave propagating structure capable of exceedingly high powers and electronic efficiency approaching 95% wherein a plurality of conductive vanes form resonant cavities between the vanes and are conductively interconnected to establish the desired phase shift along the circuit. The so-called Amplitron device has been described in the art in United States Letters Patent No. 2,673,306 issued Mar. 23, 1954 to W. C. Brown and one of the many configurations of such devices which will now be described is also illustrated in United States Letters Patent No. 3,219,882, issued Nov. 23, 1965 to F. A. Zawada et al. A plurality of anode vane members 120 is disposed in a substantial circular array with alternate anode vanes connected by a centrally disposed strap 122 and another group of alternate vanes connected by strap 124. The high frequency electromagnetic energy is coupled to the anode members by a coaxial conductor 126 having an outer coaxial member 127 being conductively connected to strap 124 by means of a lead 128. The inner coaxial conductor 129 is coupled directly to the strap 122. To assist in the positioning of the array within the tube envelope 130 the anode vane members 120 are also supported by upper and lower end shields 131 and 132. The slow wave delay line comprising the anode vane members 120 is of the nonre-entrant type and therefore dual input and output RF terminal connections are required.

The tube envelope shell 130 is maintained at ground potential as indicated by the symbol 133. Each anode vane member 120 is conductively connected to the bottom wall 134 of the tube envelope and therefore the slow wave delay line circuit is also maintained at ground potential. Concentrically disposed about the RF circuit is a circular array of cathode members 136 each having a substantially flat emitting surface 137 spaced from and extending coextensively to the sole electrode 138. Each cathode member is indirectly heated by means of a conventional heater coil 139 centrally disposed within the cathode. To provide the electrical leads for the respective electrodes as well as the cathode and heater coils one end of the tube envelope comprises annular members 140 of an insulating material in a sandwiched array with butt seal members 142 and 143. The end of the tube envelope may then be hermetically sealed by collar member 144 and metallic cover plate 146 which is Heliarc welded to the collar member as at 147. The heater coil connection may be made to a terminal 148 in the cover plate 146. Individual rod members 149 extend to a circular plate 150 which is electrically connected to heater 139. Butt seal member 142 provides a connection to the cathode members 136 by means of individual rods 151. It will be noted that a clearance hole 152 is provided in plate 150 for the conductive pins extending to the cathode members 136. The sole electrode terminal connection 143 is provided with conductive pins 153 for the conduction of current to this electrode member. Suitable exhaust tubulation means may be provided to achieve the degree of vacuum desired in the operation of the device in the manner well known in the art.

A magnet member not shown for the purposes of clarity in the explanation of the invention may be adapted to the over-all embodiment by conventional pole piece members and external magnets to provide a magnetic field extending parallel to the tube axis as indicated by the arrow 160.

In operation it is preferred that the envelope 130 be grounded as well as the outer conductor 127 of the RF terminals 126 and to apply a slightly positive DC voltage to the sole electrode 138 while the cathode electrode is maintained at a slightly less positive voltage. The electric fields thus provided between the anode vane members 120 and the cathodes 136 together with the sole electrode 138 will optimize the electron beam trajectory for maximum DC rectification of the high power microwave energy provided from an external source through the RF terminal members to the anode delay line circuit.

Figure 12:
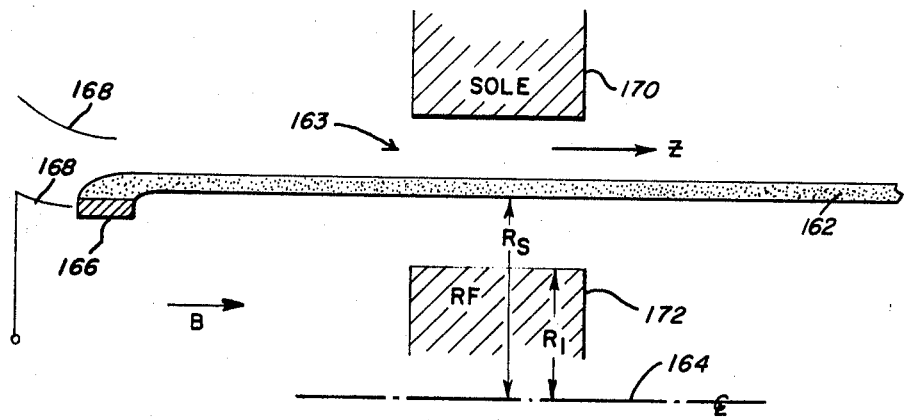
FIG. 12 is a schematic representation of still another embodiment of the present invention incorporating an axially injected hollow electron beam.

A final embodiment is disclosed in FIG. 12 and comprises an axially injected hollow beam of eletcrons traversing a substantially rectilinear interaction region 163. In conformity with the teachings of the invention the beam with its circular configuration provides not only rotational energy to the electrons but axial energy as well. In the illustration one-half of a device having an axially injected hollow beam of electrons 162 is illustrated with the center line designated by the dotted line 164. The cathode electrode 166 may be of the conventional type of electron gun emitter having focusing electrodes 168. The electron beam is focused and directed along the path 163 defined between the sole electrode 170 and the radio frequency circuit 172. The symbol $R_s$ designates the radius of the electron beam from the center line for a synchronous interacting beam of electrons. The symbol $R_1$ indicates the radius of the radio frequency delay line.

In accordance with the conventional magnetron injection gun structures a hollow beam will result having rotational energy corresponding to a potential $$V = V_0 \left(\frac{R_s}{R_1}\right)^2$$

The transit time of electrons from $R_s$ to $R_1$ may be several radio frequency periods. Thus, it may be advantageous to extend the axial length of the device to several multiples of half wavelengths in order that efficient rectification can be achieved.

This concludes the description of the invention and several alternative embodiments. It will be obvious to those skilled in the art that numerous modifications, alterations or variations may be practiced in the realization of the high power, high efficiency microwave DC rectifier utilizing the inwardly disposed radio frequency delay line circuit and the concentrically disposed boundary electrode together with a copious supply of electrons in an interaction space having a very large curvature.

What is claimed is:

1. A crossed field traveling wave microwave energy rectifier comprising:
   a slow wave delay line structure for supporting radio frequency electromagnetic waves;
   a coextensive concentrically disposed electrode spaced from said delay line and defining therewith an interaction path of substantially large curvature;
   means for generating and directing a copious supply of electrons along said path as a high density reentrant type electron beam;
   means for producing mutually perpendicular direct current electric and magnetic fields along said path which together with said radio frequency fields yield an electron space charge in said interaction path;
   the current per unit length in said interaction path being of substantially large magnitude whereby the resultant space charge will depress the direct current potentials toward the threshold potential value at which the synchronous energy exchanging relationship results between the radio frequency waves and said electrons.

2. A crossed field traveling wave microwave energy rectifier comprising:
   a slow wave delay line structure for supporting radio frequency electromagnetic waves;
   a coextensive concentrically disposed cathode member having a continuous emissive surface surrounding said delay line and defining therewith a circular interaction path of substantially large curvature;
   means for biasing said delay line at a negative direct current potential and said cathode member at a positive potential relative to said delay line;
   means producing a magnetic field perpendicular to the direct current electric fields between said cathode member and delay line;
   said mutually perpendicular direct current electric and magnetic fields together with said radio frequency fields yielding a reentrant high density electron space charge in said interaction path having a potential value substantially higher than the threshold potential value for synchronous interaction between said waves and electrons.

3. A crossed field traveling wave microwave energy rectifier comprising:
   an inwardly disposed coaxial slow wave delay line structure having a radius $R_1$ for supporting radio frequency electromagnetic waves;
   a coextensive concentrically disposed outer cathode member having a continuous surface of an emissive material to generate a copious supply of electrons along an interaction path defined with said delay line, said cathode member having a radius $R_2$;
   means for biasing said delay line at a negative direct current potential and said cathode member at a positive potential relative to said delay line;
   means for producing a magnetic field perpendicular to said electric fields;
   the relationship of the value of $R_2$ being substantially larger than the value of $R_1$ and thereby defining a circular interaction path which together with the crossed magnetic and electric fields supports a reentrane type electron space charge having a potential value higher than the requisite value for synchronous interaction between the waves and electrons.

4. A crossed field traveling wave microwave energy rectifier comprising:
   an inwardly disposed coaxial slow wave delay line structure for supporting radio frequency electromagnetic waves;
   a coextension concentrically disposed outer electrode spaced from said delay line and defining therewith a circular interaction path of substantially large curvature;
   means for injecting a high density reentrant type beam of electrons along said path including an electron gun assembly disposed at one end of said path;
   means for producing mutually perpendicular direct current electric and magnetic fields along said path which together with said radio frequency fields yield an electron space charge in said interaction path;
   said delay line being biased at negative potential and said outer electrode being biased positively with respect to said delay line;
   said electrons in said space charge traveling at a rate required for synchronous interaction with said waves thereby absorbing energy from said radio frequency waves and impinging upon said delay line structure to convert the input radio frequency energy to direct current.

5. A crossed field traveling wave microwave energy rectifier comprising:
   an inwardly disposed coaxial slow wave delay line structure;
   a coextensive concentrically disposed outer sole electrode spaced from said delay line and defining therewith a circular interaction path of substantially large curvature;

a plurality of discrete means for the generation of electrons circumferentially disposed along said interaction path;

means for producing mutually perpendicular direct current electric and magnetic fields with said delay line being biased at a negative potential and said outer electrode and electron generation means being biased positively with respect to said delay line;

said crossed electric and magnetic fields together with said radio frequency fields yielding a reentrant high density electron space charge in said interaction space having a potential value substantially above the threshold potential value for synchronous interaction between said waves and electrons.

6. A crossed field traveling wave microwave energy rectifier comprising:

an evacuated envelope;

a non-reentrant slow wave delay line structure for supporting radio frequency electromagnetic waves;

means coupling input and output high power radio frequency signal transmission lines to the ends of said delay line;

a coextensive concentrically disposed outer sole electrode spaced from said delay line and defining therewith a circular interaction path of substantially large curvature;

a plurality of indirectly heated cathode electron emitters spaced along said interaction path;

means for producing mutually perpendicular direct current electric and magnetic fields with said delay line being biased at a negative potential and said outer electrode and cathode emitters being biased positively with respect to said delay line;

said crossed electric and magnetic fields together with said radio frequency fields yielding a reentrant high density electron beam in said interaction space.

7. A crossed field traveling wave microwave energy rectifier according to claim 6 wherein each of said cathode emitters is provided with a substantially planar emissive surface oppositely disposed from said sole electrode.

8. A crossed field traveling wave microwave energy rectifier according to claim 6 wherein concentric conductive members alternately interconnect different elements of said delay line structure along the interior portions thereof disposed closest to the axis of the tube envelope.

9. A crossed field traveling wave microwave energy rectifier according to claim 6 wherein said envelope is biased at ground potential and said delay line is conductively connected to said envelope.

10. A crossed field traveling wave microwave energy rectifier according to claim 6 wherein the separation between the electron emitters is selected to provide a minimum transit time of one frequency period to allow the electrons to coalesce into a reentrant beam of gradually reducing diameter.

11. A crossed field traveling wave microwave energy rectifier according to claim 6 wherein an end cover member of said envelope supports and provides means for energizing the cathode emitter heaters.

12. A crossed field traveling wave microwave energy rectifier according to claim 6 wherein the potential of an electron beam at any selected point $R_s$ traveling in synchronous relationship with said waves is determined by the equation:

$$V = V_0 \left(\frac{R_s}{R_1}\right)^2$$

where $R_1$ is the radius of the delay line structure, $R_s$ is the radius of an electron beam and $V_0$ is a scaling factor derived from the equation:

$$V_0 = \frac{1}{2}\frac{m}{e}\left(\frac{2\pi f}{k}\right)^2 R_1^2$$

where $k$ is the mode number, $f$ is the frequency, $m$ is the mass of the electron and $e$ is the electron charge.

13. In combination:

an evacuated envelope having a longitudinal axis;

an inner and an outer coaxially disposed boundary electrode member defining therebetween an interaction path of substantially large curvature disposed within said envelope;

said inner electrode member defining means for the propagation of radio frequency electromagnetic wave signals and being biased at a negative direct current potential;

said outer electrode member defining means for the generation and direction of a high density reentrant type electron beam along said interaction path and being biased at a positive potential relative to said inner electrode member;

means for producing a uniform magnetic field parallel to the envelope axis and perpendicular to the direct current electric fields;

said crossed electric and magnetic fields together with said radio frequency fields providing for a synchronous energy exchanging relationship whereby said electrons impinge on said inner electrode and convert radio frequency power into direct current power.

References Cited

UNITED STATES PATENTS

| | | | |
|---|---|---|---|
| 3,073,991 | 1/1963 | Osepchuk | 315—39.3 |
| 3,189,750 | 6/1965 | Dain et al. | 321—8 X |
| 3,219,904 | 11/1965 | Osepchuk | 321—8 |
| 3,302,126 | 1/1967 | Orr. | |
| 3,382,399 | 5/1968 | Garoff | 315—3.5 |

JOHN F. COUCH, Primary Examiner

W. H. BEHA, Assistant Examiner

U.S. Cl. X.R.

315—3.5, 39.3